Feb. 11, 1958 H. LEVINE 2,823,293
ELECTRIC SKILLET HANDLE STRUCTURE
Filed Dec. 12, 1955 2 Sheets-Sheet 1
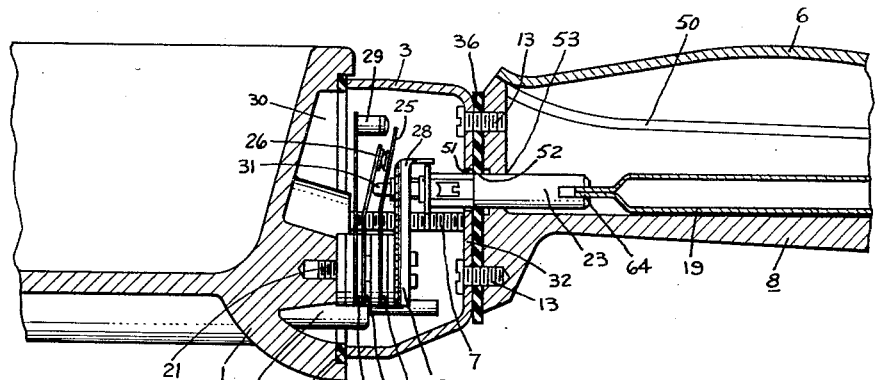
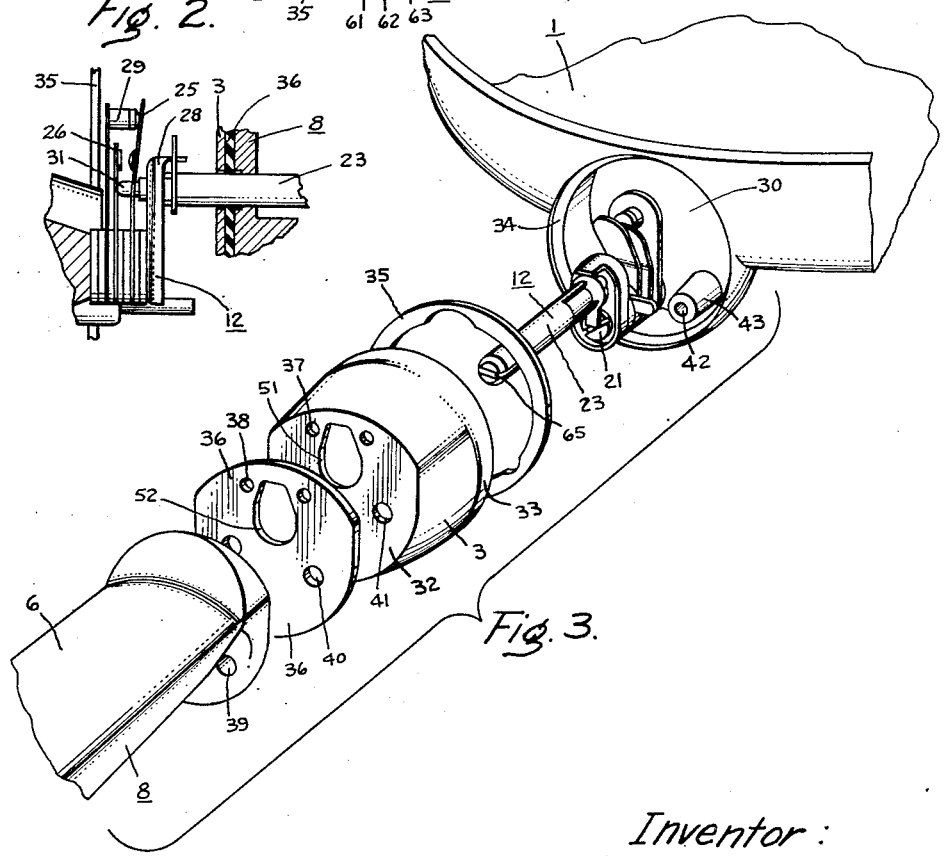
Inventor:
Harvey Levine
by Laurence R. Kempton
His Attorney.

Feb. 11, 1958 H. LEVINE 2,823,293
ELECTRIC SKILLET HANDLE STRUCTURE
Filed Dec. 12, 1955 2 Sheets-Sheet 2

Inventor:
Harvey Levine
by Lawrence R. Kempton
His Attorney

United States Patent Office 2,823,293
Patented Feb. 11, 1958

2,823,293

ELECTRIC SKILLET HANDLE STRUCTURE

Harvey Levine, Fairfield, Conn., assignor to General Electric Company, a corporation of New York Application December 12, 1955, Serial No. 552,579

6 Claims. (Cl. 219—44)

This invention relates to automatically-controlled electric cooking utensils with sealed electrical and operating components.

Electric cooking utensils with automatic temperature control means provide a valuable addition to the culinary art, but present a serious problem with respect to reliable, liquid-tight seals for all of the electrical operating components, such as heater terminals, the thermostatic switch mechanism, and the like. The liquid-tight seals are especially desirable to permit immersion of the utensil for cleaning.

Accordingly, it is an object of this invention to provide an improved automatically-controlled cooking utensil with all electrical improved and operating components sealed within enclosures forming part of the utensil.

In accordance with one aspect of this invention, temperature control means is mounted within a separate enclosure, with a water-tight washer between the enclosure and a side wall of the electric cooking vessel. The handle body is mounted on this enclosure and a second washer is interposed between the handle body and the enclosure to provide a second water-tight seal. By this arrangement, the skillet may be immersed for washing without any danger of water entering the chamber for the temperature control mechanism.

In those cases where it is desired to indicate heating of the skillet, an indicating light is provided in a separate handle cover. The handle cover is secured to the handle body by an adhesive which provides a water-tight seal.

Other objects and attendant advantages of this invention will be apparent from the following description taken in connection with the accompanying drawing in which:

Fig. 1 is a cross-sectional view of my improved handle and thermostat arrangement;

Fig. 2 is a cross-sectional view showing the thermostat switch in an open position;

Fig. 3 is an exploded view showing the thermostat cover assembly; and

Figure 4:
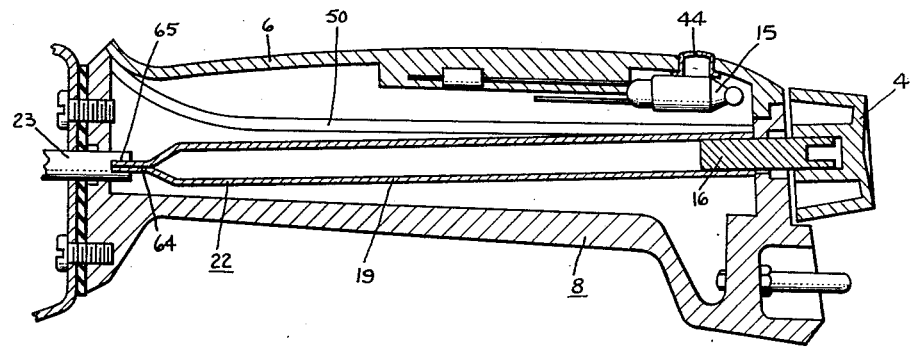
Fig. 4 is a cross-sectional view of the hollow handle.

Referring now to Fig. 1 of the drawing, there is illustrated a cooking vessel 1 having a heating element 2 embedded in the lower portion thereof. A cup-shaped receptacle 30 may be formed on said cooking vessel for mounting thermostat 12 and handle 8 onto said cooking vessel. Screw 21 or other suitable servicing means fixedly secures thermostat 12 to skillet 1.

I provide a thermostat 12 for controlling the temperature of the skillet. The details of the thermostat do not form a part of my invention; however, it is believed that a brief description of the thermostat is desirable for a thorough understanding of the invention. Thermostat 12 comprises a plurality of spaced arms 25, 26 and 27 separated by insulating disks 61, 62, and 63 in a manner well-known in the art. Arm 27 is bimetallic and it is the temperature-responsive device of thermostat 12. Since bimetal 27 is mounted in good heat exchange relationship with skillet 1, an increase in temperature will cause this element to move to the right as shown in Fig. 1. A generally cylindrical projection 29 of insulating material is fixed on the end of arm 27 for actuating the thermostat switch. Switch arms 25 and 26 are preferably normally spring-biased toward each other, and bent so as to be normally biased to the right as shown in Fig. 1.

I provide means for adjusting the position of switch 25 and 26. In the arrangement illustrated this comprises a thermostat set shaft 23 or other suitable means for moving switch blade 26. A support arm 28 is relatively rigid and is provided with an internally-threaded hole for the reception of thermostat set shaft 23. Thermostat set shaft 23 is generally cylindrical and is provided at one end thereof with a projection, which may be formed by insulating material, fixed thereto. An intermediate portion of thermostat set shaft 23 is provided with screw threads (not shown) for engagement with the screw threads formed in support arm 28. Support arm 26 is spring-biased toward projection 31 so as to remain in contact therewith. Arm 25 is provided with an enlarged hole in order to allow projection 31 to pass freely therethrough. When thermostat set shaft 23 is rotated clockwise, projection 31 which is fixed thereto moves away from the cooking vessel. Conversely, counterclockwise rotation of thermostat set shaft 23 will cause projection 31 to move to the left toward the cooking vessel as viewed in Fig. 1.

A cover which may be cup-shaped is provided for housing thermostat 12. As viewed in Fig. 3, thermostat cover 3 includes a generally flat bottom wall 32 having a plurality of holes therein, a curved side wall, and a peripheral flat circular edge 33. A flat circular groove 34 is provided at the outer edge of receptacle 30 for the reception of an annular water-tight washer 35. A second water-tight washer 36 partaking of the general shape of the flat bottom of thermostat cover 3 is utilized to effect a water-tight seal between thermostat cover 3 and handle 8. As viewed in Fig. 1, it can be readily seen that washer 35 provides an effective seal between thermostat cover 3 and cooking vessel 1, and washer 36 provides an effective seal between thermostat cover 3 and handle 8. Cover screws 13 or other suitable securing means are passed through openings 37 in thermostat cover 3 and openings 38 in washer 36, and may be screwed into handle 8 for securing cover 3 to handle 8. Elongated screws 7 or other suitable securing means are passed through openings 39 in handle 8, openings 40 in washer 36 as well as openings 41 in thermostat cover 3, and may be screwed into holes 42 within lugs 43 for mounting handle 8 and thermostat cover 3 on cooking vessel 1. It can be seen that as handle screws 7 are tightened, thermostat cover 3 will be caused to move toward skillet 1, thereby to engage washer 35. As shown in Fig. 1, set shaft 23 is generally cylindrical and extends through opening 51 in cover 3, opening 52 in washer 36, and opening 53 in handle 8. Watertight seals 35 and 36 may be formed from a high-temperature silicone rubber or like material to provide the requisite resilient seal which is able to withstand cooking temperatures.

In order to actuate thermostat 12 from the outer end of handle 8, an elongated control shaft is provided. As shown in Fig. 4, control shaft 22 includes the aforementioned thermostat set shaft 23, control tube 19, control knob shaft 16 and control knob 4. The outer end of handle 8 is provided with circular bearing means for receiving control knob shaft 16. Control knob 4 is fixedly mounted on one end of control knob shaft 16 to cause a rotation thereof. Elongated control tube 19 is provided for operatively connecting control knob shaft 16 with thermostat set shaft 23. One end portion of control tube 19 is slid over and fixed to the other end of control knob shaft 16. An inner end 64 of control tube 19 is flattened for insertion within a slot 65 formed in the end of thermostat set shaft 23. It can be seen, therefore, that rotation of control knob 4 will cause corresponding rotation of control knob shaft 16, control tube 19 and thermostat set shaft 23. Control knob 4, control knob shaft 16, and control tube 19 remain axially fixed during rotation thereof, whereas thermostat set shaft 23 moves axially because of the aforementioned cooperating screw threads formed in arm 28. Slotted connection 64, 65 between thermostat set shaft 23 and control tube 19 allows set shaft 23 to move axially with respect to control tube 19.

I, also, provide means for indicating when the cooking vessel is being operated. In a preferred arrangement, this includes an indicating light 15. The upper portion of handle 8 is provided with an enlarged opening 50, and a handle cover 6 is provided for closing enlarged opening 50. Indicating light 15 is mounted in one end portion of handle cover 6. A small opening which is closed by a window 44 is provided in handle cover 6 above indicating light 15 for allowing indicating light 15 to be observed. Window 44 is sealed to handle cover 6 by a water-tight adhesive. After indicating light 15 is fixed to the handle cover, handle cover 6 is secured to handle 8 by a water-tight adhesive which is spread around the edges of the handle cover. This completes the water-tight seal to allow immersion of the entire vessel to the outer end of the handle.

*Operation*

When it is desired to operate the electric cooking vessel, control knob 4 is rotated clockwise, to the desired temperature setting. This rotation causes corresponding rotation of control knob shaft 16, control tube 19 and thermostat set shaft 23. Thermostat set shaft 23 is moved axially away from the cooking vessel by this movement, and flattened end 40 of control tube 14 will slide further within slot 65. In addition, the normal outward spring bias of arm 26 allows arm 26 to move to the right as viewed in Fig. 1 when projection 31 is moved to the right, thereby allowing the switch to close and the heating element to be energized. Since spring 26 is stronger than spring 25, spring 26 will cause spring 25 to move to the right as viewed in Fig. 1, thereby to enlarge the gap between projection 29 and the extension of spring arm 25; the larger the gap, the higher the temperature setting. As the temperature within the cooking vessel increases, bimetal 27 will move to the right, as shown in Fig. 1, until projection 29 contacts the extension on spring 25, thereby to urge spring 25 to the right and open the switch and to turn off the power to the heating element of the cooking vessel. As the temperature within the cooking vessel decreases, bimetal 27 gradually moves to the left thereby allowing projection 29 to move to the left along with switch arm 25. When the temperature within the cooking vessel drops below the set temperature, bimetal 27 moves far enough to the left, as shown in Fig. 1, to allow arm 25 to move to the left to close the switch, thereby energizing the heating element.

When it is desired to wash the cooking vessel, the entire vessel 1 and handle 8 up to control knob 4 may be immersed in water. Washer 35 provides a water-tight seal between vessel 1 and thermostat cover 3, washer 36 provides a water-tight seal between handle 8 and thermostat cover 3 while allowing thermostat set shaft 23 to rotate freely, and a water-tight adhesive between handle cover 6 and handle 8 provides an effective seal between the handle and the cover.

While there has been shown and described a particular embodiment of this invention, it will be obvious to those skilled in the art that various changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. A cooking vessel having wall means for mounting a handle comprising a thermostat fixed to said wall means, a cover surrounding and housing said thermostat, a first washer interposed between said wall means and said thermostat cover for providing a water-tight seal between said cover and said wall means, a hollow handle having an inner end and an outer end, means for mounting the inner end of said handle on said thermostat cover including a second washer interposed between said thermostat cover and said handle whereby to provide a water-tight seal between said thermostat cover and said handle, and a rotatable control shaft extending through said handle and said thermostat cover for setting said thermostat.

2. A cooking vessel having wall means for mounting a handle comprising a thermostat fixed to said wall means, a cup-shaped cover enclosing said thermostat, means for fixing said cover to said wall means, a hollow handle having an inner end, an outer end and an upper portion, means for fixing the inner end of said handle to said thermostat cover, an opening in the upper portion of said handle, a handle cover closing said opening, an opening in said handle cover, and an indicating light mounted on said handle cover beneath said opening in said handle cover.

3. A cooking vessel having wall means for mounting a handle comprising a thermostat fixed to said wall means, a cup-shaped thermostat cover surrounding said thermostat, a first washer interposed between said wall means and said thermostat cover for providing a water-tight seal between said cover and said wall means, a hollow handle having an inner end, an outer end, and an upper portion, means for mounting the inner end of said handle on said thermostat cover including a second washer interposed between said handle and said thermostat cover for providing a water-tight seal between said thermostat cover and said handle, an opening in the upper portion of said handle, and a handle cover adhesively secured to said handle for providing a water-tight closure for the opening in the upper portion of said handle.

4. A cooking vessel, comprising generally flat wall means, a thermostat fixed to said wall means, an annular groove formed in said wall means, an annular silicone washer disposed in said annular groove, a cup-shaped thermostat cover having a generally circular peripheral edge and a generally flat bottom surrounding said thermostat, a hollow handle, means for mounting said handle to the flat bottom of said thermostat cover including a second silicone washer interposed between said handle and said thermostat cover for providing a water-tight seal between said thermostat cover and said handle, and means for urging the peripheral edge of said thermostat cover into sealing contact with said first silicone washer.

5. A cooking vessel having wall means for mounting a handle comprising a thermostat fixed to said wall means, a thermostat cover surrounding said thermostat, a first silicone washer interposed between said wall means and said thermostat cover for providing a water-tight seal between said cover and said wall means, a hollow handle having an inner end, an outer end, and an upper portion, means for mounting the inner end of said handle on said thermostat cover including a second silicone washer interposed between said handle and said thermostat cover for providing a water-tight seal between said thermostat cover and said handle, an opening in the upper portion of said handle, a handle cover adhesively secured to said handle for providing a water-tight closure for the opening in said handle, and a rotatable thermostat control shaft spaced within said handle and said cover, and extending outwardly from the outer end of said handle.

6. A cooking vessel having wall means for mounting a handle comprising a thermostat fixed to said wall means, a cup-shaped thermostat cover surrounding said thermostat, a first washer interposed between said wall means and said thermostat cover for providing a water-tight seal between said cover and said wall means, a hollow handle having an inner end and an outer end, and means for mounting the inner end of said handle on said thermostat cover including a second washer interposed between said handle and said thermostat cover for providing a water-tight seal between said thermostat cover and said handle.

References Cited in the file of this patent

UNITED STATES PATENTS

| | | |
|---|---|---|
| 2,519,432 | Brown | Aug. 22, 1950 |
| 2,530,643 | Berg et al. | Nov. 21, 1950 |
| 2,571,782 | Swenson | Oct. 16, 1951 |
| 2,744,995 | Jepson | May 8, 1956 |

FOREIGN PATENTS

| | | |
|---|---|---|
| 664,113 | Great Britain | Jan. 2, 1952 |